United States Patent
Gerteis

[11] Patent Number: 5,258,128
[45] Date of Patent: Nov. 2, 1993

[54] PROCESS FOR SPLITTING OFF SMALL PIECES OF FILTER CAKE FROM A PRESSURE FILTER

[75] Inventor: Hans Gerteis, Bietigheim-Bissingen, Fed. Rep. of Germany

[73] Assignee: Heinkel Industriezentrifugen GmbH & Co., Bietigheim-Bissingen, Fed. Rep. of Germany

[21] Appl. No.: 720,800
[22] PCT Filed: Oct. 10, 1989
[86] PCT No.: PCT/EP89/01189
  § 371 Date: Jul. 19, 1991
  § 102(e) Date: Jul. 19, 1991
[87] PCT Pub. No.: WO90/08588
  PCT Pub. Date: Aug. 9, 1990
[51] Int. Cl.⁵ ............................................. B01D 37/00
[52] U.S. Cl. ............................. 210/769; 210/236; 210/791
[58] Field of Search ............... 210/769, 771, 791, 106, 210/435, 236, 408, 236, 350; 100/211

[56] References Cited
U.S. PATENT DOCUMENTS 3,753,499  8/1973  Gwilliam ............................ 100/211
4,246,122  1/1981  Keat .................................... 210/350
4,702,831  10/1987 Gerteis ................................ 210/236
4,707,256  11/1987 Gerteis ................................ 100/211
5,139,665  8/1992  Gerteis ................................ 210/408

Primary Examiner—Robert A. Dawson
Assistant Examiner—Ana M. Fortuna
Attorney, Agent, or Firm—Shenier & O'Connor

[57] ABSTRACT

A method for removing filter cake from a pressure filter element for liquid solid mixtures comprising an outer casing, a removable lid for closing the outer casing, a tubular filter element which projects from the lid into the outer casing and on the outside of which the filter cake is deposited, a membrane which during operation folds back between the outer casing and the filter element, a pressure joint on the outer casing and inlet and outlet of a pressure medium, an inlet line which conveys the liquid-solid mixture into the space between the membrane and the filter element and an outlet line which conveys the filtrate from the interior of the filter element. In order to split off small pieces of the filter cake from the filter element, a gaseous pressure medium is admitted into the filter cake formed on the outside of the filter element for as long as the filter cake is still completely or partly surrounded by the fold back membrane.

2 Claims, 1 Drawing Sheet

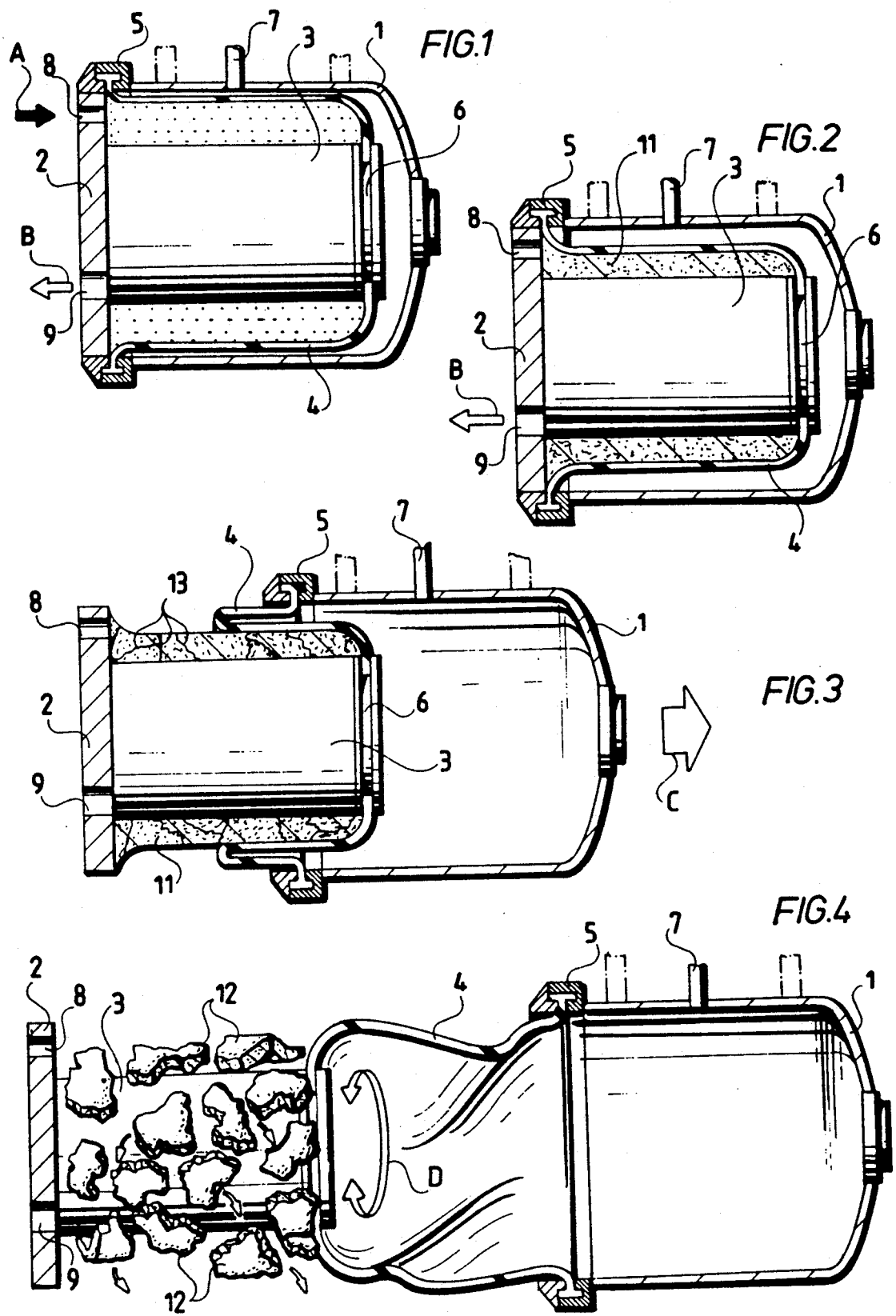

PROCESS FOR SPLITTING OFF SMALL PIECES OF FILTER CAKE FROM A PRESSURE FILTER

The invention relates to a process for splitting off small pieces of filter cake from a pressure filter for liquid-solid mixtures comprising an outer casing, a lid for releasably closing the outer casing, a tubular filter element which protrudes from the lid into the outer casing and on the outside of which the filter cake which is to be split off settles, a reversible membrane which is located between the outer casing and the filter element when the filter is in operation, a pressure connection piece on the outer casing, an inlet line for the liquid-solid mixture leading to the space between membrane and filter element and an outlet line for the filtrate leading out of the interior of the filter element.

In such pressure filters with a reversible membrane, the filter cake has until now been split off from the filter element when the membrane has turned inside out and the filter element has been pulled out of the outer casing completely, with the splitting-off being promoted by the filter element being turned back and forth about its axis. However, it is only in the rarest of cases that one succeeds in splitting off the filter cake in small pieces. Normally the filter cake falls off the filter element in the form of large, board-like pieces, with the result that it can only be conducted out of the outlet opening of the housing surrounding the pressure filter after separate comminution, for example, crushing by a special apparatus. The subsequent comminution of the split-off filter cake is, of course, an undesired, additional operation which one would like to avoid.

With a pressure filter of the kind in question, the object of the invention is to disclose a process for splitting off small pieces of filter cake which results in such breaking-up of the filter cake into small fragments that subsequent comminution, in particular crushing of the filter cake, is no longer necessary and the resulting pieces can readily pass out through the outlet opening of the housing surrounding the pressure filter.

The object is accomplished in accordance with the invention in that after formation of the filter cake on the outside of the filter element, a gaseous pressure medium is introduced into the interior of the filter element as long as the filter cake is still completely or partly surrounded by the reversible membrane.

The following description serves in conjunction with the appended drawings to explain the invention in further detail. The drawings show:

FIGS. 1 to 4 various operating stages of a pressure filter with a reversible membrane.

The pressure filter for liquid-solid mixtures illustrated in the drawings comprises a boiler-shaped outer casing 1 which is closed on one side thereof (on the right in the drawings). The opposite, open end face of the outer casing 1 is sealingly closable by a lid 2. A tubular filter element 3, for example, in the form of a screen cylinder covered with a filter cloth protrudes rigidly from the lid 2 into the interior of the outer casing 1. A flexible, reversible, tubular membrane 4 impermeable to liquid is clamped with its one rim on an opening flange 5 of the outer casing 1 and with its other rim on an end face flange 6 of the filter element 3. The outer casing 1 comprises a pressure connection piece 7 for the introduction and discharge of a liquid pressure medium. An inlet line 8 for the liquid-solid mixture leading to the space between filter element 3 and membrane 4 is formed on the lid 2. The lid also comprises an outlet line 9 leading out of the interior of the filter element 3.

The pressure filter described herein is surrounded in its entirety by a sealed-off housing (not illustrated).

The pressure filter described herein is operated as follows: The liquid-solid mixture to be filtered is introduced through the inlet line 8 in the direction of arrow A to the space between filter element 3 and membrane 4. After closure of the line 8, liquid pressure medium is introduced into the space between outer casing 1 and membrane 4 through the pressure connection piece 7, and a pressure is thereby exerted via the membrane 4 on the mixture. The resulting pressed-out filtrate passes into the interior of the filter element 3 and flows off via the outlet line 9 in the direction of arrow B. On the outside of the filter element 3 there remains a substantially dehumidified filter cake 11 which is still surrounded by the closely fitting membrane 4 (FIG. 2).

After the liquid pressure medium has been pumped out of the space between outer casing 1 and membrane 4, the outer casing 1 is detached from the lid 2 in the direction of arrow C - cf. FIG. 3. The membrane 4 thereby gradually turns inside out in the manner shown in FIG. 3, with its inner side becoming its outer side, until the entire filter element 3 with the filter cake 11 carried by it is finally exposed. By turning the lid 2 back and forth in the direction of arrow D (FIG. 4) the filter cake 11 is then split off in the form of pieces 12 which are as small as possible. The pieces 12 of the filter cake pass out of the above-mentioned outlet opening of the housing surrounding the pressure filter. After the filter cake 11 has become detached from the filter element 3, the latter is put back into the outer casing 1 again so that the initial state according to FIG. 1 is attained and a new filtering cycle can begin.

It has been shown that the splitting-off of the filter cake in the manner described herein mostly results not in the desired small pieces 12, but in large, board-like sections which are unable to pass out of the outlet opening of the outer housing.

In accordance with the invention, the filter cake 11 is reliably broken down into small pieces 12 in the following way: After formation of the filter cake, i.e., for example, when the pressure filter is in the state according to FIG. 2, a gaseous pressure medium is introduced into the interior of the filter element 3, for example, via line 9. The introduction of the gaseous pressure medium, for example, compressed air, thus takes place at a point in time at which the filter cake 11 on the filter element 3 is still completely surrounded by the membrane 4. It was found that introduction of the gaseous pressure medium results in the formation of numerous cracks 13 in the filter cake along which the filter cake breaks down into small pieces after the pressure filter is opened.

Introduction of the gaseous pressure medium is preferably continued during transition from the state according to FIG. 2 to that according to FIG. 4, i.e., as long as the filter cake 11 is still partly surrounded by the reversible membrane 4. In this way, the splitting-off of the filter cake into small pieces as shown in FIG. 4 is finally achieved. The pieces 12 of filter cake are so small that they can readily pass out through the outlet opening of the outer housing.

It is particularly advantageous for the gaseous pressure medium to be introduced intermittently, i.e., in surges into the interior of the filter element 3.

I claim:

1. In a method of operating a pressure filter for liquid-solid mixtures, said filter having an outer casing and a lid for releasably closing the outer casing and a tubular filter element which extends from the lid into the outer casing and a reversible membrane located between the outer casing and the filter element when the filter is in operation with an inlet for the liquid-solid mixture leading to the space between the membrane and the filter element and an outlet leading out of the interior of the filter element and a connection on the outer casing for introducing a pressure medium into the space between the outer casing and the membrane to drive the liquid of said liquid-solid mixture through said filter and out of said outlet to form a filter cake on said filter element between said filter element and said membrane with the membrane resting against the filter cake, said method including the step of splitting said filter cake off said filter, said step of splitting said filter cake off said filter including the step of introducing a gaseous pressure medium into the interior of the filter element while said filter cake is still completely or partially surrounded by the reversible membrane and with the membrane still resting against the filter cake.

2. The method as in claim 1 in which said step of introducing said gaseous pressure medium comprises introducing said gaseous pressure medium in stages.

* * * * *

UNITED STATES PATENT AND TRADEMARK OFFICE
CERTIFICATE OF CORRECTION

PATENT NO.   :   5,258,128
DATED        :   November 2, 1993
INVENTOR(S)  :   Hans Gerteis It is certified that error appears in the above-identified patent and that said Letters Patent is hereby corrected as shown below:

On title page, add item
    [30] Foreign Application Priority Data
    January 26, 1989    Germany    P 39 02 200.5

Signed and Sealed this

Third Day of May, 1994

*Attest:*

BRUCE LEHMAN

*Attesting Officer*    *Commissioner of Patents and Trademarks*